(12) United States Patent
Chin et al.

(10) Patent No.: US 10,119,175 B2
(45) Date of Patent: Nov. 6, 2018

(54) CASE HARDENING METHOD FOR HIGH PERFORMANCE LONG LIFE MARTENSITIC STAINLESS STEEL BEARINGS

(71) Applicant: United Technologies Corporation, Farmington, CT (US)

(72) Inventors: Herbert A Chin, Charlotte, NC (US); David A Haluck, Stuart, FL (US); William P Ogden, Glastonbury, CT (US); Michael A Moulin, Willington, CT (US)

(73) Assignee: United Technologies Corporation, Farmington, CT (US)

( * ) Notice: Subject to any disclaimer, the term of this patent is extended or adjusted under 35 U.S.C. 154(b) by 92 days.

(21) Appl. No.: 15/038,828

(22) PCT Filed: Nov. 24, 2014

(86) PCT No.: PCT/US2014/067073
§ 371 (c)(1),
(2) Date: May 24, 2016

(87) PCT Pub. No.: WO2015/077692
PCT Pub. Date: May 28, 2015

(65) Prior Publication Data
US 2017/0016084 A1 Jan. 19, 2017

Related U.S. Application Data

(60) Provisional application No. 61/908,275, filed on Nov. 25, 2013.

(51) Int. Cl.
| | | |
|---|---|---|
| *C21D 9/38* | (2006.01) | |
| *C21D 1/06* | (2006.01) | |
| *C21D 7/13* | (2006.01) | |
| *C23C 8/02* | (2006.01) | |
| *C23C 8/22* | (2006.01) | |
| *C23C 8/32* | (2006.01) | |
| *F16C 33/32* | (2006.01) | |
| *F16C 33/34* | (2006.01) | |
| *F16C 33/62* | (2006.01) | |
| *C21D 6/00* | (2006.01) | |

(52) U.S. Cl.
CPC .............. *C21D 9/38* (2013.01); *C21D 1/06* (2013.01); *C21D 7/13* (2013.01); *C23C 8/02* (2013.01); *C23C 8/22* (2013.01); *C23C 8/32* (2013.01); *F16C 33/32* (2013.01); *F16C 33/34* (2013.01); *F16C 33/62* (2013.01); *C21D 6/002* (2013.01); *C21D 2211/008* (2013.01); *F16C 2204/72* (2013.01); *F16C 2223/12* (2013.01); *F16C 2223/16* (2013.01)

(58) Field of Classification Search
CPC .... C23C 8/22; C23C 8/32; C23C 8/46; C23C 8/56; C23C 8/66; C23C 8/76
See application file for complete search history.

(56) References Cited

U.S. PATENT DOCUMENTS

| | | |
|---|---|---|
| 7,470,336 B2 | 12/2008 | Buck |
| 8,480,817 B2 | 7/2013 | Jain et al. |
| 2003/0102057 A1 | 6/2003 | Short |
| 2005/0133119 A1 | 6/2005 | Hammond et al. |
| 2005/0269074 A1 | 12/2005 | Chitwood |
| 2011/0108164 A1 | 5/2011 | Jain et al. |
| 2012/0255653 A1 | 10/2012 | Chin et al. |
| 2013/0032251 A1 | 2/2013 | Chin et al. |
| 2016/0032976 A1 | 2/2016 | Chin et al. |

FOREIGN PATENT DOCUMENTS

EP  2971210 A1  1/2016

OTHER PUBLICATIONS

European Search Report for Application No. 14863663.2 dated Jun. 19, 2017.
Extended European Search Report for Application No. 148636632 dated Oct. 27, 2017.

*Primary Examiner* — Jessee R Roe
(74) *Attorney, Agent, or Firm* — Bachman & LaPointe, P.C.

(57) ABSTRACT

A method for cost effectively case hardening a component formed from a martensitic stainless steel material with a desired metallurgical condition for high temperature, high rolling contact fatigue, corrosion and spall initiation and propagation resistance bearing performance. The method describes a method to significantly reduce the carburization or carbo-nitriding process times for appreciable reduction in manufacturing cost. The Method includes the steps of: forming the component from a martensitic stainless steel material having an ASTM grain size of 9 or finer; and subjecting the component to one of a carburization and a carbo-nitriding treatment with significantly lower case hardening times for manufacturing cost-effectiveness.

5 Claims, 4 Drawing Sheets

CASE HARDENING METHOD FOR HIGH PERFORMANCE LONG LIFE MARTENSITIC STAINLESS STEEL BEARINGS

CROSS REFERENCE TO RELATED APPLICATION

This application claims the benefit of provisional application Ser. No. 61/908,275, filed Nov. 25, 2013.

BACKGROUND

The present disclosure relates to a case hardening method for high performance long life martensitic stainless steel bearings.

Modern aerospace bearings are required to sustain and transfer high stresses from radial and/or axial loads under rapid rotational motion, over a range of temperatures from sub-zero to those that challenge the capability of the lubricant and steel materials. As such, the steel material has to have high load bearing capability (strength and hardness) and other characteristics that include, but are not limited to, temperature capability, fracture toughness, wear resistance, and oil-out capability. One key material characteristic that is embodied in those fundamental requirements is the rolling contact fatigue (RCF) endurance limit of the steel. This characteristic is used in the design and lifting of mechanical systems components (bearings and gears).

The RCF endurance limit of the bearing steels is defined as the materials capability limit when a surface spall initiation event occurs. That event is caused by a combination of independent bearing operating variables, stress, temperature and rolling contact fatigue cycles/time.

Martensitic steels that are suited for over 95% of high performance bearings and gears due to their unique balance of physical and mechanical properties: moderately high elastic modulus, thermal conductivity, ultra-high hardness and compressive strength, limited to moderate fracture toughness, temperature capability to approximately 600 F, and rolling contact fatigue resistance.

Current hardening processes for martensitic stainless steels take over 100 hours of carburization time in high cost furnaces like vacuum carburization or plasma carburization. Such process times are more than two times required for conventional case hardening non-stainless martensitic steels, and at proportionally higher cost. The cost negatively impacts the cost of component design to cost metrics.

There is a need for a method which significantly reduces case hardening time for high performance long life martensitic stainless steel bearings.

SUMMARY

In accordance with the present disclosure, there is provided a method for case hardening high performance long life martensitic stainless steel components such as bearings.

In accordance with the present disclosure, there is provided a method for case hardening a component formed from a martensitic stainless steel material, which method broadly comprises the steps of: forming a component from a martensitic stainless steel material having a grain size of ASTM (American Soc. For the Testing of Materials) 9 or finer; and subjecting the component to one of a carburization and a carbo-nitriding treatment.

In another and alternative embodiment, the component forming step may comprise providing a martensitic stainless steel material having a grain size of at least 5 and thermo-mechanically processing the martensitic stainless steel material to have a grain size of 9 or finer.

In another and alternative step, the thermo-mechanically processing step may comprise subjecting the martensitic stainless steel material to a first reduction of at least 50%, a second reduction of at least 60% and a third reduction of at least 70%.

In another and alternative step, each of the first, second and third reductions may be performed by forging or ring rolling at an elevated temperature using a strain rate of $5 \times 10^{-1}$ inch/inch/second or higher.

In another and alternative embodiment, the first reduction may be performed at a grain coarsening temperature of the martensitic stainless steel material, the second reduction may be performed at a temperature <1850 F, and the third reduction may be performed at a temperature above the recrystallization temperature of the martensitic stainless steel material and below the temperature at which the second reduction is performed.

In another and alternative embodiment, the subjecting step may comprise subjecting the component to a carburization process.

In another and alternative embodiment, the subjecting step may comprise subjecting the component to a carbo-nitriding process.

Further in accordance with the present disclosure, a method for forming a martensitic stainless steel material may broadly comprise the steps of: providing a martensitic stainless steel material; and thermo-mechanically processing the martensitic stainless steel material to have a grain size of 9 or finer.

In another and alternative embodiment, the thermo-mechanically processing step may comprise subjecting the martensitic stainless steel to a first reduction of at least 50%, a second reduction of at least 60% and a third reduction of at least 70%.

In another and alternative embodiment, each of the first, second, and third reductions may be performed by forging or ring rolling at an elevated temperature using a strain rate in the range of $5.0 \times 10^{-1}$ inch/inch/second or higher.

In another and alternative embodiment, the first reduction may be performed at a higher temperature of 1900 to 1850 F of the martensitic stainless steel material, the second reduction may be performed i" a temperature range of 1850 to 1775 F, and the third reduction may be performed at a temperature above the recrystallization temperature of the martensitic stainless steel material and below the temperature at which the second reduction is performed.

Further, in accordance with the present disclosure, there is provided a component which broadly comprises: a core formed from a martensitic stainless steel material having a grain size of 9 or coarser in the final heat treat condition; and a case hardening structure surrounding the core.

Other details of the method for case hardening high performance long life martensitic stainless steel components are set forth in the following detailed description and the accompanying drawings wherein like reference numerals depict like elements.

DETAILED DESCRIPTION

The basis of the present disclosure is a method which significantly reduces the case hardening time to produce an adequate case depth for aerospace main shaft bearings with acceptable metallurgical condition. The reduced case hardening times directly and positively impact the manufacturing cost of the bearing.

The technical approach to the cost effective case hardening method for martensitic stainless steels is based on (a) thermodynamics and (b) the kinetics of the martensitic stainless steel.

With regard to the thermo-dynamics for carburization or carbo-nitriding case hardening of a class III super 12% chromium martensitic stainless steel with acceptable metallurgical condition, a martensitic stainless steel may be chosen whose compositional make-up favors the formation of moderately stable $M_{23}C_6$ carbides over the thermodynamically more stable MC and $M_7C_3$ carbides.

A suitable martensitic stainless steel may have a composition consisting of from 8.0 to 18 wt % chromium, up to 16 wt % cobalt, up to 5.0 wt % vanadium, up to 8.0 wt % molybdenum, up to 8.0 wt % nickel, up to 4.0 wt % manganese, up to 2.0 wt % silicon, up to 6.0 wt % tungsten, up to 2.0 wt % titanium, up to 4.0 wt % niobium, and the balance iron AND meet the provisions of the paragraph above.

There are a number of steels that can be used in the present invention, e.g. PYROWEAR 675 made by Carpenter Technologies having a composition in wt %: Fe-13 Cr-5.4Co-1.8Mo-2.6Ni-0.6Mn-0.6V-0.4Si-0.07C; CSS-42L made by Latrobe Steel having a composition in wt %: Fe-14Cr-12.4Co.4.7Mo-2.05Ni-0.6V-0.05C; and AFC-77 made by Crucible Research.

Other alloys which may be used have a composition in wt % as follows:

Fe-13.75Cr-5Co-3Mo-3Ni-0.08V-0.75Mn-0.4Si-0.15C;
Fe-14Cr-5Co-4Mo-3.5Ni-0.08V-0.22Mn-0.3Si0.15C;
Fe-13.5Cr-3.75Co-3.5Mo-3Ni-0.08V-0.25Mn-0.3Si-0.15C;
Fe-13.5Cr-3.75Co-3.5Mo-3Ni-1Ti-1Mn-0.3Si-0.15C;
Fe-15.25Cr-5Co-3.5Mo-4Ni-0.25V-0.2Mn-0.25Si-0.15C; and
Fe-14Cr-2.75Co-3.25Mo-3.5Ni-0.3V-0.3Mn-0.3Si-0.15C.

Figure 1:
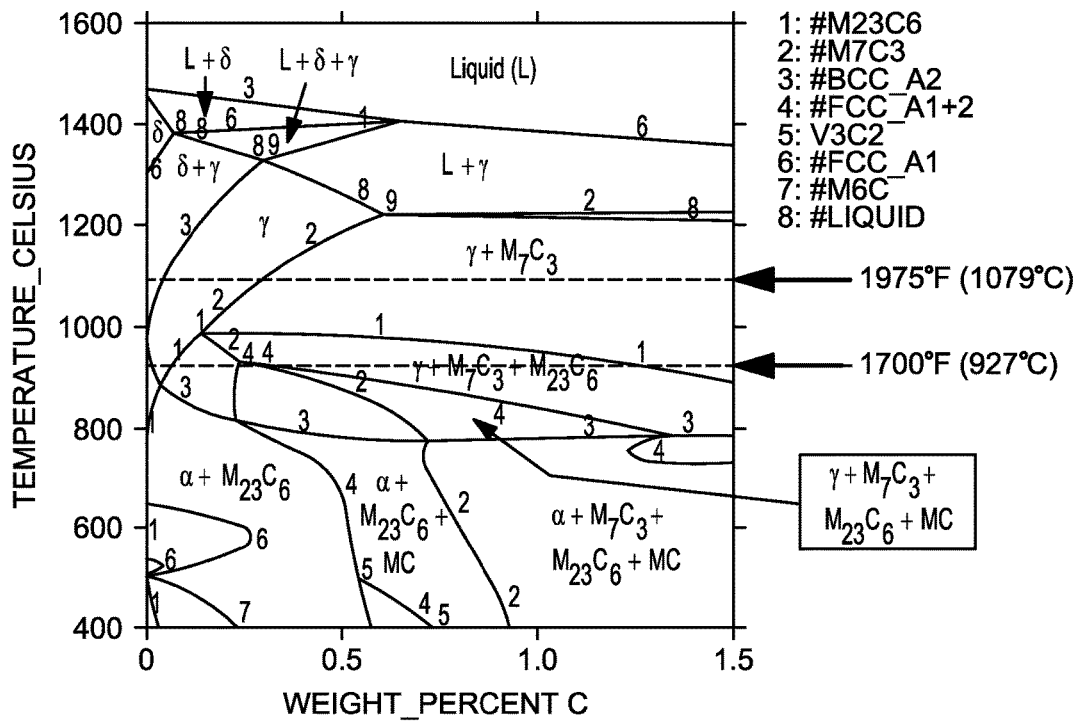
FIG. 1 is a Fe—Cr—C—X isopleth phase diagram showing the preferred temperature for carburization of a stainless steel such as PYROWEAR 675.

The selected steels may then be case hardened by carburization or carbo-nitriding in a temperature/composition field including carbon or carbon+nitrogen that ranges from the base composition to the aim elevated carbon or carbon+ nitrogen in the case hardened region, where there is a preference for the formation of moderate thermodynamic stability carbides like $M_{23}C_7$, $M_6C$, or $M_2C$, where M represents a metal atom and C represents a carbon atom, or metal-carbo-nitride. This is shown in FIG. 1 which is a Fe—Cr—C—X Isopleth Phase Diagram showing the preferred temperature for carburization of a steel, such as Pyrowear 675, where a temperature of 1700 F (927 C)(line A) is a yes and a temperature of 1975 F (1079 C)(line B) is a no.

A key to successful case hardening of martensitic stainless steels to an acceptable metallurgical condition for high performance is the kinetics of carbon or carbon+nitrogen addition to the surface to be hardened to a prescribed depth. Carbon and nitrogen are elements that significantly harden and strengthen the steel martensite phase for increased load bearing capability. To meet this objective, the method must allow a uniform diffusion of carbon or carbon+nitrogen into the steel to the prescribed depth. That is, no localized build up of those elements anywhere in the steel microstructure during or after the case hardening treatment. To accomplish this, one has to recognize the different diffusion paths for the carbon and nitrogen in the steel structure and the relative rates of each path. In order of diffusion ease or speed, fastest are (1) grain boundaries, then (2) twin boundaries and the slowest diffusion is by (3) bulk diffusion through the crystal structure of the grain. This is schematically shown in FIG. 2.

Figure 2:
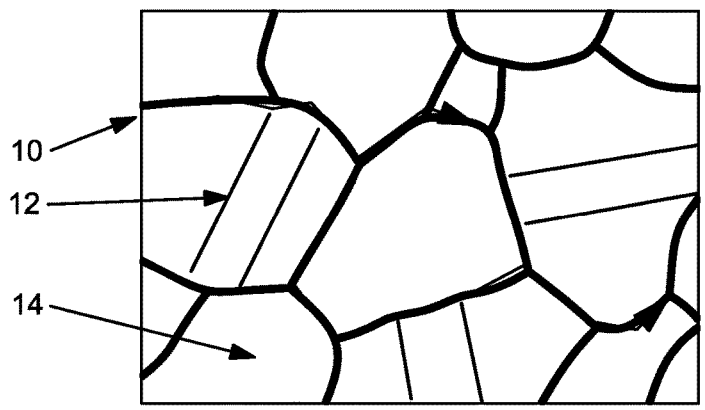
FIG. 2 is a schematic illustration showing the relative rates of carbon diffusion in a martensitic stainless steel structure.

As shown in FIG. 2, carbon atom diffusion in a polycrystalline structure, from a highest to lowest rate is open structured grain boundaries 10 (fast), twin boundaries 12 (moderate) and bulk diffusion in grains 14 (very slow). Refractory alloying additions to stainless steel retard diffusion further.

Based on the fundamental microstructure related diffusion rates described above, the technical approach embodied in this disclosure for significantly reduced case hardening process times is to increase diffusion rates as provided by a finer grain structure. That is, increased ground boundary area per unit volume for easy carbon or carbon+nitrogen to diffuse uninhibited. For any retardation of carbon diffusion on the grain boundaries will result in significant localized build up of those elements and the formation of unacceptable chunky carbides like MC and/or $M_7C_3$ or carbonitrides. The grain size to (1) average grain diameter and number of grains per unit volume and (2) grain boundary area per unit volume is shown in FIGS. 3 and 4 and table 1 respectively.

Figure 3:
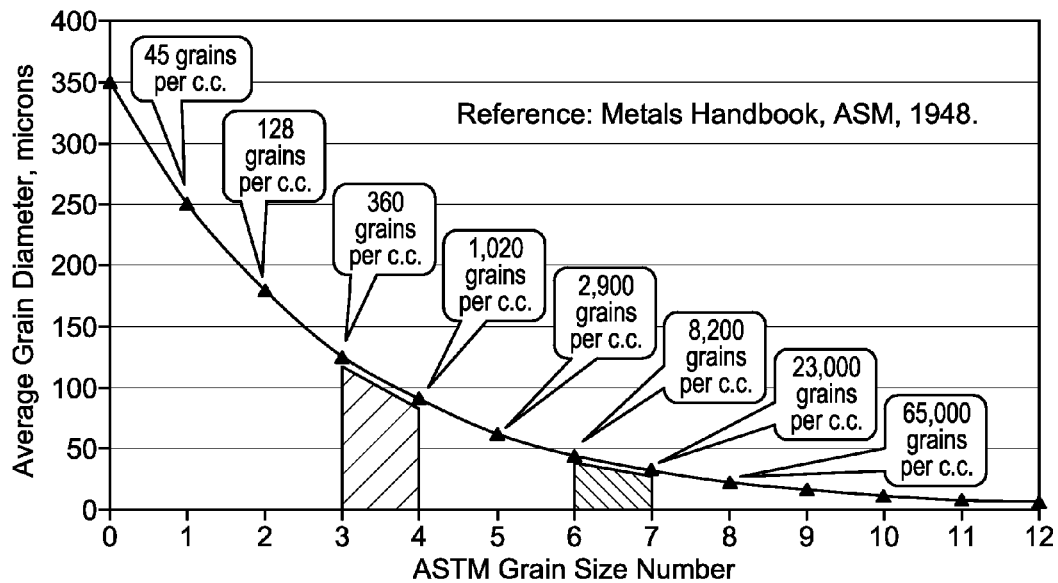
FIG. 3 is a plot of average grain diameter and number of grains per unit volume versus grain size.
Figure 4:
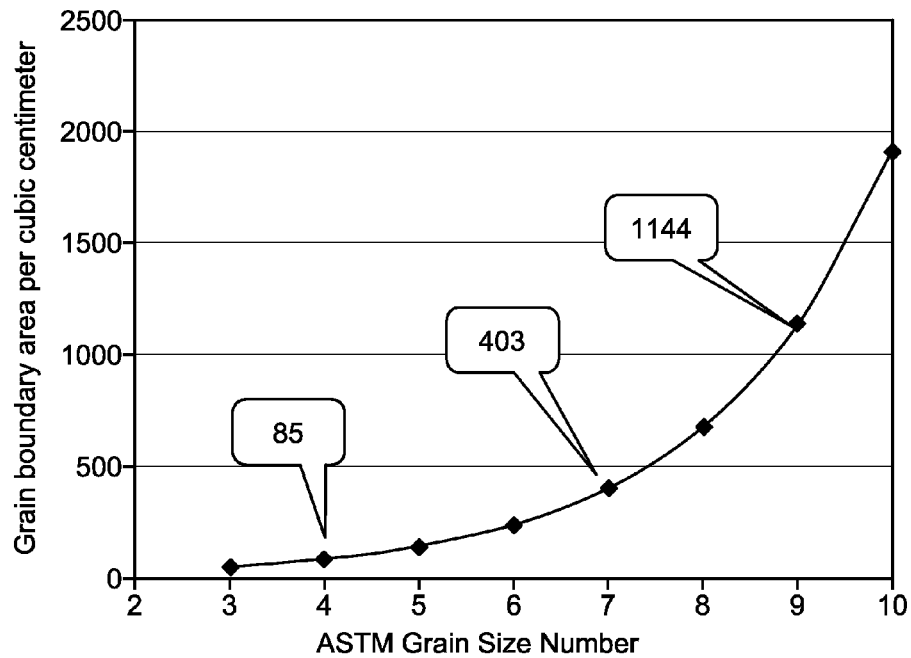
FIG. 4 is a plot of grain boundary area as a function of grain size.

FIG. 3 is a plot of average grain diameter and number of grains per unit volume versus grain size. FIG. 4 is a plot of grain boundary area as a function of grain size.

Table I is a tabulation of grain characteristics as a function of grain size.

| ASTM Grain Size Number | Number of Grains/mm3 | Average Grain Diameter, mm | Average Grain Diameter, microns | Surface area per mm3 |
|---|---|---|---|---|
| −2 | 2 | 0.75 | 750 | 3.76 |
| −1 | 5.6 | 0.5 | 500 | 6.29 |
| 0 | 16 | 0.35 | 350 | 10.64 |
| 1 | 45 | 0.25 | 250 | 17.84 |
| 2 | 128 | 0.18 | 180 | 30.08 |
| 3 | 360 | 0.125 | 125 | 50.45 |
| 4 | 1020 | 0.091 | 91 | 84.92 |
| 5 | 2900 | 0.062 | 62 | 143.19 |
| 6 | 8200 | 0.044 | 44 | 240.78 |
| 7 | 23000 | 0.032 | 32 | 403.26 |
| 8 | 65000 | 0.022 | 22 | 677.91 |
| 9 | 185000 | 0.016 | 16 | 1143.68 |

-continued

| ASTM Grain Size Number | Number of Grains/mm3 | Average Grain Diameter, mm | Average Grain Diameter, microns | Surface area per mm3 |
|---|---|---|---|---|
| 10 | 520000 | 0.011 | 11 | 1917.43 |
| 11 | 1500000 | 0.008 | 8 | 3256.6 |
| 12 | 4200000 | 0.006 | 6 | 5449.33 |

Example I

Figure 5:
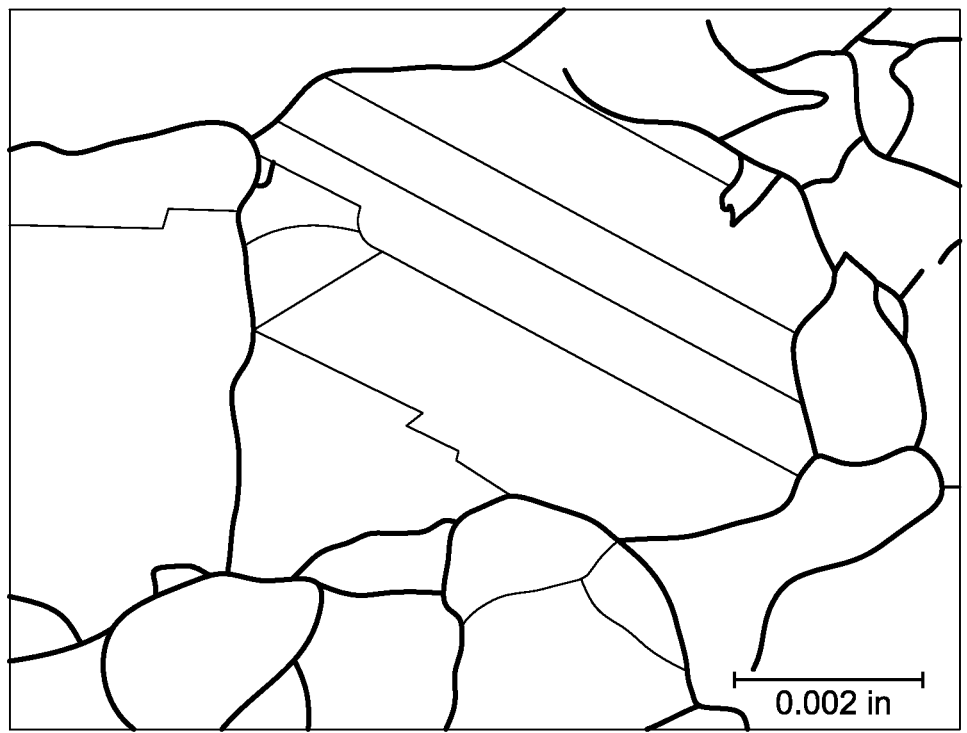
FIG. 5 is a photomicrograph of coarse grained ASTM 3 PYROWEAR 675 with unacceptable microstructure: coarse carbides that necklace the grain and twin boundaries.

This example is directed to stainless steel with an ASTM grain size of 3 to 4. Many manufactures have tried but few have succeeded in processing such a material. This is because they typically hot process the martensitic stainless steel at about 1900 F to 2000 F. The result is a relatively coarse grained condition of grain size ASTM #3 to 4, that when carburized case hardened produces an unacceptable metallurgical microstructure. That unacceptable metallurgical microstructure is shown in FIG. 5. Referring to FIG. 4 and Table I, the grain size 4 has 1020 grains per cubic centimeter. That amount of grain boundary area is insufficient for rapid carbon or carbon+nitrogen and they become locally saturated, resulting in the unacceptable coarse carbide formation observed in the grain and twin boundaries.

Example II

Figure 6:
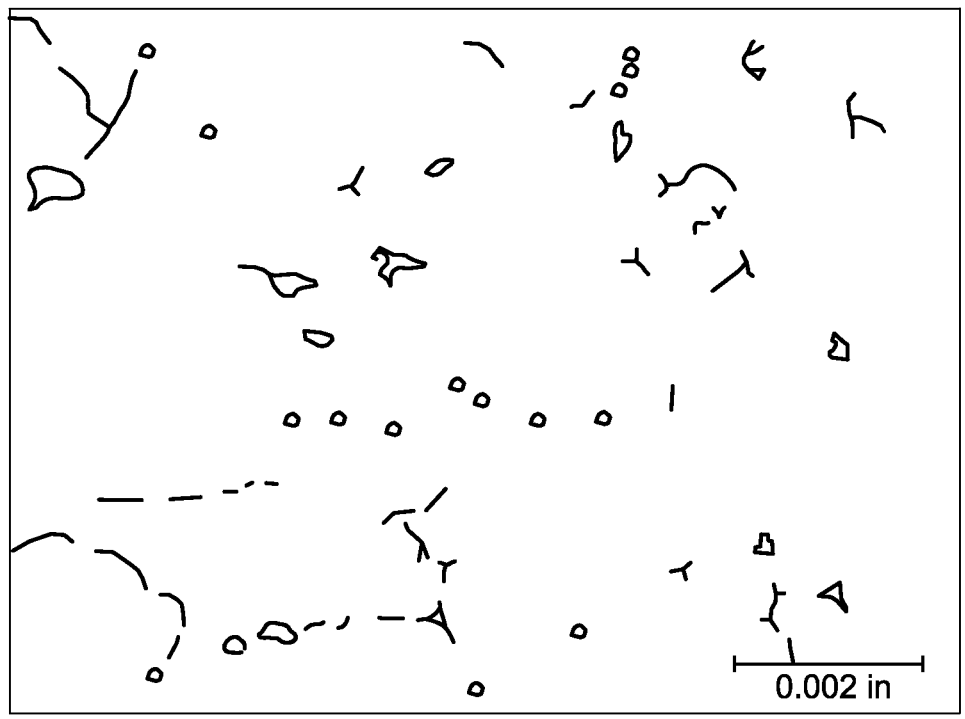
FIG. 6 is a photomicrograph of coarse grained ASTM 3 PYROWEAR 675 with unacceptable microstructure: coarse carbides that necklace the grain and twin boundaries.

This example is directed to stainless steel with an ASTM grain size of 7 to 8. When this grain size is attained in the processed stainless steel, it can be successfully carburized case hardened to an acceptable metallurgical microstructure as shown in FIG. 6, and described as a uniform dispersion of moderate to fine carbides in a fine grain structure. That is, no unacceptable coarse carbide networking anywhere in the microstructure.

Grain statistics for the grain size 7 are as follows. Grain size 7 has 23,000 grains per cubic centimeter compared to 1020 for grain size 4, and a grain boundary area of 403 square centimeter per cubic centimeter as compared to 85 for the grain size 4 condition; that is a 4.7× increased grain boundary area. That amount of grain boundary area is sufficient for rapid carbon or carbon+nitrogen without any local saturation, resulting in the acceptable microstructure shown in FIG. 6.

Despite that success (grain size 7 to 8), the carburization time to meet the aerospace case depth requirement necessitates process times in excess of 100 hours in specialized expensive systems, resulting in costly case hardening as compared to conventional non-stainless martensitic steels.

In accordance with the present disclosure, cost effective case hardening (significantly reduced carburization times) is accomplished by increasing the grain boundary area per unit volume of steel to provide an even greater easy diffusion path for the carbon or carbon+nitrogen to diffuse into the stainless steel without any localized build up of those element(s). The method embodied herein is to process the martensitic stainless steel to a grain size 9 or finer. This can be accomplished through a sequential thermo-mechanical process schedule, where processing starts at 1900 F (1038 C) maximum, and the steel is processed per schematic shown in FIG. 7 with a finishing temperature of 1725 F (940 C) or lower. In doing so, the grain size of ASTM 9 can be achieved.

Figure 7:
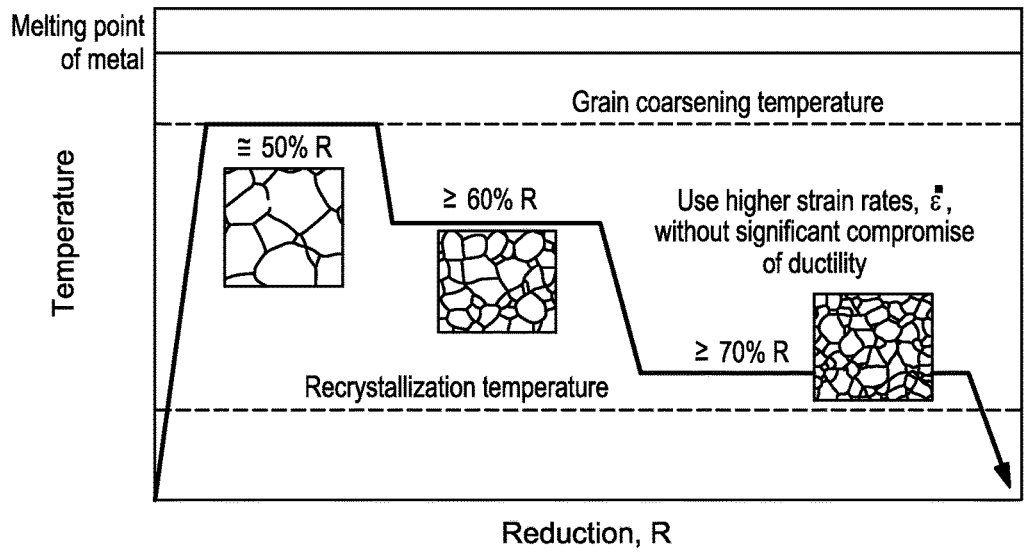
FIG. 7 is a schematic illustration of the thermo-mechanical processing for producing uniform fine grain rings and rolling elements.

As shown in FIG. 7, one may begin with a starting stock of martensitic stainless steel having a grain size of 5. Thereafter, one may first forge the stainless steel by performing a reduction of approximately 50% at the grain coarsening temperature of the stainless steel at a strain rate of at least $5.0 \times 10^{-1}$ inch/inch/second. One may take a 5 to 20% reduction per pass according to the capability of the processing equipment). The first reduction may be taken at a temperature of from 1850 to 1900 degrees F. In a second step, the martensitic stainless steel is forged to a reduction of greater than or equal to 60% at a temperature in the range of from 1775 to 1850 degrees F. at the same strain rate as set out above. In a final step, one then forges the stainless steel to a reduction of greater than or equal to 70% at a temperature slightly above the recrystallization (Rx) temperature at the strain rate set forth hereinbefore. The temperature may be >25 F above the Rx temperature to allow for process variations of the stainless steel. This yields a martensitic stainless steel which has a grain size in the range of 9 or finer. This thermo-mechanical process enables one to use higher strain rates without a significant compromise of ductility. This thermo-mechanical process enables one to produce uniform fine grain rings and rolling elements.

Figure 8:
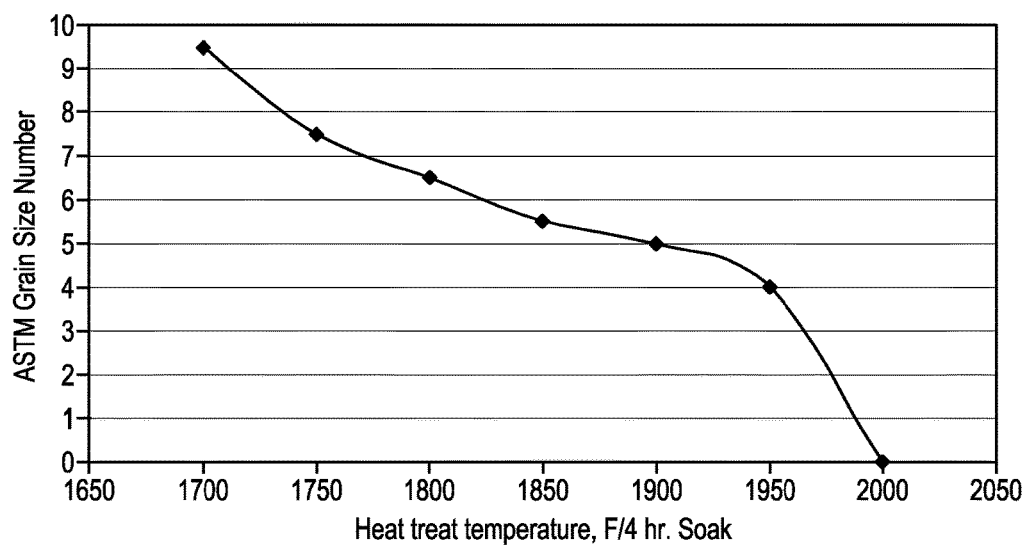
FIG. 8 is a plot showing PYROWEAR 675 grain size as a function of exposure temperature.

FIG. 8 illustrates PYROWEAR 675 grain size as a function of heat treatment exposure temperature for a 4 hour soak.

Grain size 9 has 185,000 grains per cubic centimeter compared to 23,000 for grain size 7, i.e. an 8× increase. Grain boundaries of 1144 square centimeter per cubic centimeter are present in a grain size 9 condition as compared to 403 for the grain size 7 condition. That is a 2.8× increase in grain boundary area. That increased grain boundary area allows even more rapid carbon or carbon+nitrogen without any local saturation, for acceptable microstructure as shown in FIG. 6. The carburization times can be reduced by at least 50%.

After the martensitic stainless steel having a grain size in the range of 9 or finer is produced, it may be shaped into a product such as a bearing or a gear. The product may be machined into a rough form.

After being formed into a desired product form, the stainless steel material may be subjected to a carbo-nitriding process. Processes capable of carbo-nitriding the aforementioned martensitic stainless steel material to a desired condition include, but are not limited to:

A carbo-nitriding process at a pressure of 1 atmosphere or lower and a temperature which varies with steel composition and is typically in the range of 1650 to 2000° F. for a time which varies according to desired case depth, from 40 to 200 hrs., typically. The atmosphere composition has carbon and nitrogen "potentials" as indicated below. Typically, the carbide and nitrogen (C+N) levels are less than the aim level due to a "gettering" (kinetic effort of getting more C and N from the source) effect by the steel during carbo-nitriding process;

Vacuum carbo-nitriding process at a pressure and a temperature which varies with steel composition, typically in the range of 1650 to 2000° F. for a time which varies according to the desired case depth, from 40 to 200 hrs. typically. The atmosphere composition has carbon and nitrogen "potentials" as indicated below. Typically, the C+N levels are less than the aim level due to a "gettering" effect by the steel during carbo-nitriding process; and Plasma carbo-nitriding process at a pressure and a temperatures which varies with steel composition, typically in the range of 1650 to 2000° F. for a time which varies according to desired case depth, from 40 to 200 hrs., typically. The atmosphere composition has carbon and nitrogen "potentials" as indicated below. Typically, the C+N levels are less than the aim level due to a "gettering" effect by the steel during carbo-nitriding process.

The above processes may be conducted to produce prescribed levels of carbon (0.2 to 0.55 wt %) and nitrogen (0.2 to 1.2 wt %) in the hardened case for attaining goal hardness and corrosion resistance as follows:

Total carbon+nitrogen in the range of from 0.5 to 1.7 wt % for hardness desired case hardness;

Carbon+nitrogen levels in treated surface case limited to ensure chromium content of carbo-nitrided case >6 wt %, for good corrosion resistance. An example of this requirement is indicated below. For 0.35 wt % carbon+0.4 wt % nitrogen, the chromium content of the matrix is >6 wt %.

A carburization process, such as vacuum or plasma-assisted carburization may be used to introduce the prescribed amount of carbon into the surface of the steel product. Vacuum or plasma assisted carburization allows the diffusion rate of the carbon to be more readily controllable to achieve the desired uniform dispersion of carbon into the surface of the steel product. Gas carburization may also be used.

After carburizing the product may be selectively machined. This is followed by austenitizing, quenching, subzero cooling and tempering to achieve the desired hardness and microstructure. The steel product is finish machine to conform to design configuration.

The case hardened structure formed in accordance with the present disclosure will be the same as described in earlier sections, i.e. a uniform fine dispersion of carbides or carbo-nitrides in the hardened case. However, it should be noted that the as-case carburized or as-carbo-nitrided condition may have slightly coarser carbide or carbo-nitride precipitates than the later harden+tempered condition of the final product. The subsequent Harden Heat Treatment relies of the solubility of M23C6 carbides or carbo-nitrides at the harden temperature, followed by controlled precipitation during the temper treatment to a finer dispersion.

There has been provided a case hardening method for high performance long life martensitic stainless steel bearings. While the case hardening method for high performance long life martensitic stainless steel bearings has been described in the context of specific embodiments thereof, unforeseen alternatives, modifications, and variations may become apparent to those skilled in the art having read the foregoing description. Accordingly, it is intended to embrace those alternatives, modifications, and variations as fall within the broad scope of the appended claims.

What is claimed is:

1. A method for case hardening a component formed from a martensitic stainless steel material, which method comprises the steps of:

forming said component from a martensitic stainless steel material having an ASTM grain size of 9 or finer; and subjecting said component to a carbo-nitriding treatment.

2. The method of claim 1, wherein said component forming step comprising providing a martensitic stainless steel material having an ASTM grain size of at least 5 and thermo-mechanically processing said martensitic stainless steel material to have an ASTM grain size of 9 or finer.

3. The method of claim 2, wherein said thermo-mechanically processing step comprises subjecting said martensitic stainless steel to a first reduction of at least 50%, a second reduction of at least 60% and a third reduction of at least 70%.

4. The method of claim 3, wherein each of said first, second, and third reductions is performed by forging or ring rolling at an elevated temperature using a strain rate in the range of 5.0×10-1 inch/inch/second or higher.

5. The method of claim 3, wherein said first reduction is performed at a higher temperature of 1900 to 1850 degrees Fahrenheit of said martensitic stainless steel material, said second reduction is performed at a temperature range of 1850 to 1775 degrees Fahrenheit, and said third reduction is performed at a temperature above the recrystallization temperature of the martensitic stainless steel material and below the temperature at which the second reduction is performed.

\* \* \* \* \*